April 7, 1953 C. JOHNSON 2,633,697
THERMOSTATIC FLUID COUPLING MECHANISM
Filed Feb. 23, 1949
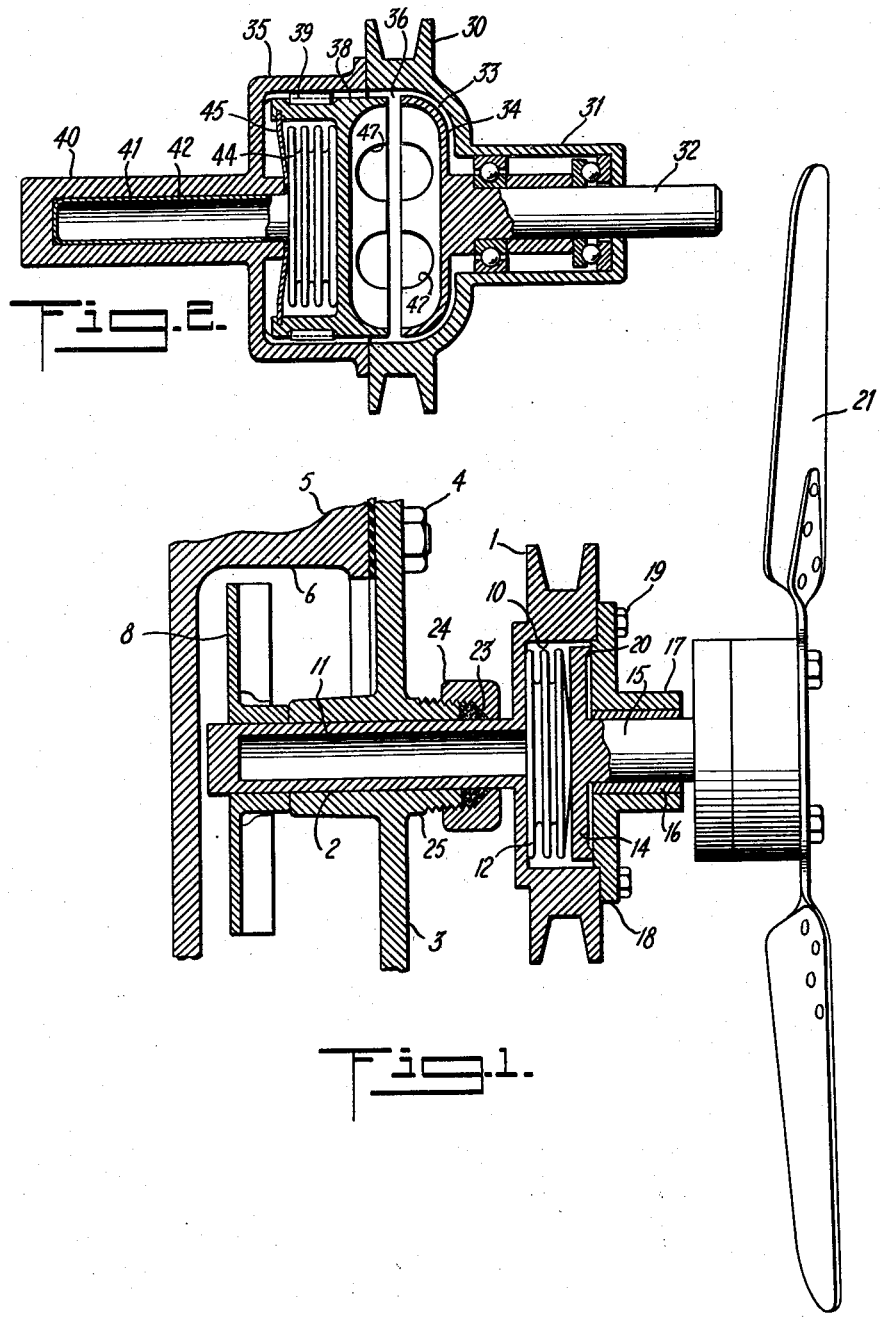
INVENTOR.
CLARENCE JOHNSON
BY Ralph C. Dustin
ATTORNEY Patented Apr. 7, 1953

2,633,697

UNITED STATES PATENT OFFICE 2,633,697

THERMOSTATIC FLUID COUPLING MECHANISM

Clarence Johnson, Cleveland, Ohio

Application February 23, 1949, Serial No. 77,709

1 Claim. (Cl. 60—12)

This invention relates to clutch mechanisms, and more particularly to clutch mechanisms which operate automatically in response to changes in a condition for controlling the connection of a driving member to a driven member.

In most automobiles there is provided a fan which is driven continuously for cooling the motor regardless of whether or not such cooling action is needed. By providing a clutch mechanism which operates to connect the fan in driven relation with the motor only when the motor temperature exceeds a predetermined value, substantial savings will be made in the energy employed for driving the fan. In addition to the saving of energy, there is maintained, especially during the colder weather, temperature conditions at which the motor operates more efficiently. It will be appreciated that a clutch mechanism of a similar type may be made responsive to temperature which varies as a result of other changing conditions. For instance, the degree to which an automobile battery is charged may determine the temperature effecting operation of a clutch mechanism to control the driving of the generator by the motor. In other cases, the clutch may be made operative to control the driving of a compressor in response to changes in its discharge pressure.

A preferred form of my invention may include a driving member having an expansible device, such as a bellows, fixed for rotation therewith. A fluid which expands or contracts with changes in temperature may be enclosed within a chamber formed partly, at least, by this bellows. Two clutch members, one supported for free rotation and the other fixed for rotation with the driving member, are adapted to be moved relative to each other on expansion or contraction of the bellows for varying the drive connection between the driving member and a driven member. The clutch members may be provided with surfaces engageable with each other for effecting drive, or the adjacent faces of the clutch members may be provided with fins which are variably coupled by a liquid, such as oil.

An object of my invention is to provide an improved clutch mechanism. Another object is to provide a clutch mechanism which is operative in response to changes in a variable condition for controlling the drive of a driven member from a driving member. Still another object is to provide a clutch mechanism having a device fixed for rotation with a driving member and operating in response to changes in temperature for controlling the connection of a driven member in driven relation with a driving member. Other objects will appear in the course of the following description.

In the accompanying drawing there are shown for purposes of illustration two forms which my invention may assume in practise.

In this drawing:

Fig. 1 is a sectional view showing one form of my improved clutch mechanism associated with a portion of the cooling system of a motor for controlling the operation of a fan.

Fig. 2 is a sectional view of another form of my improved clutch mechanism.

As shown in Fig. 1, a pulley 1 is provided with an axially projecting portion 2 which is rotatably supported by a plate 3 attached as by screws 4, to a cylinder block 5 of a motor. The plate 3 covers a portion of the passage means 6 through which cooling water is circulated, and attached to the inner end of the projecting portion 2 is a member 8 which is adapted to pump water through the passage means when rotated. The pulley 1 is driven continuously from the power shaft of the motor through a belt, not shown. A recess 10 is formed in the pulley, and a bore 11 extends through the portion 2 from the bottom of the recess to a point adjacent the pump member 8. Connected in fluid tight relation to the bottom of the recess 10 is a bellows 12 having its interior communicating with the bore 11. If desired, there may be provided instead a bulb which is sealed to the end of the bellows and which fits loosely within the bore 11. This arrangement permits an easy replacement of parts when necessary. The space within the bellows and the bore 11 or the bulb, if the latter is used, is filled with a liquid which expands when its temperature is increased. Arranged within the recess 10 adjacent the bellows is a clutch element 14 formed integral with a shaft 15 which is journaled in a bearing 16 carried by the hub portions 17 of a clutch plate 18 attached, as by screws 19, to the pulley 1. The surface of the clutch element adjacent the plate 18 is recessed so as to provide a projecting annular portion 20 at its outer periphery for engaging the inner surface of the plate. If desired, there may be provided on the clutch element and plate a friction material which provides suitable clutching action when they are moved into engagement with each other. The end of the bellows adjacent the clutch element is rounded, as shown, so as to reduce as much as possible the friction between them when they rotate relative to each other. Connected to the shaft 15 is a fan 21 for delivering cooling air over the motor when driven. To prevent the escape of cooling water from the passage means 6 along the portion 2, there is provided a packing 23 which is held in fluid tight engagement with the portion 2 by a collar 24 threaded upon a hub portion 25 of the plate 3.

When the temperature of the motor is sufficiently low, the bellows 12 remains contracted so that the clutch element 14 is free of the plate 18. As the temperature increases, the volume of the liquid increases and expands the bellows to move the clutch element toward the plate 18. At a predetermined high temperature, the projecting portion 20 on the clutch element is forced against the plate 18 to effect a driving of the fan 21 with the pulley 1.

In Fig. 2 there is shown a pulley 30 adapted to be driven continuously by a motor and having a hub portion 31 in which there is journaled a shaft 32 to which a fan must be connected. The pulley is recessed at 33 to receive a clutch element 34 fixed to the shaft 32. Attached to the pulley by any suitable means, not shown, is a casing member 35 which cooperates with the recess 33 to form a closed chamber 36. A clutch element 38 is arranged within the casing 35 and is keyed to the latter at 39 so that it rotates with the casing but is adapted to move axially thereof. A projecting portion 40 on the casing may be extended into the water passage of a motor and be rotatably supported in the same manner as the projection 2 of Fig. 1. A bore 41 is provided in the portion 40 for receiving a bulb 42 which is sealed to one end of a bellows 44 arranged in the housing and acting against the clutch member 38. An annular plate 45 of spring steel is connected to the housing in any suitable manner at the end of the bore 41 and is fixed to the clutch element 38 for holding the latter normally in a position away from the clutch element 34. Formed on the adjacent faces of the clutch elements are fins 47, and the chamber 36 is partially filled with a liquid, such as oil, to provide a coupling of the clutch elements by the action of the liquid on the fins. The interior of the bellows and the bulb 42 is filled with a liquid which expands on an increase in temperature.

When the temperature is low, the clutch element 38 is held in a position near the left hand end of the housing 35 so that very little coupling of the clutch elements is obtained. As the temperature increases, the bellows 44 acts to move the clutch element 38 against the action of the spring member 45 toward the clutch element 34. The level of the liquid between the clutch elements rises and gradually increases the coupling until, at a predetermined temperature, the shaft 32 is driven at the same speed as the pulley 30.

While there have been shown in this application two forms which my invention may assume in practise, it will be understood that the invention may be modified and embodied in various other forms without departing from its spirit or the scope of the appended claim.

What I claim as new and desire to secure by United States Letters Patent is:

A clutch mechanism for controlling the driving of a fan in response to changes in the temperature of a motor comprising, in combination, a driving pulley having a projecting portion rotatably supported by the motor and subjected to the heat of the latter, an enclosed chamber within said pulley, a driven member rotatably supported by said driving member and adapted to have a fan connected thereto, a clutch element fixed to said driven member and fitting freely within said chamber, a clutch element fixed for rotation with said driving member and movable bodily within said chamber relative to said first mentioned clutch element for varying the volume of the space within said chamber, means for yieldingly urging said last mentioned clutch element to a position remote from said first mentioned clutch element, an expansible chamber device in said chamber subjected to the heat of said projecting portion a liquid filling said expansible chamber device and expanding on an increase in temperature, said expansible chamber device operating on expansion to move said last mentioned clutch element toward said first mentioned clutch element a liquid filling said chamber to different levels depending upon the relative positions of said clutch elements, and fins on the adjacent faces of said clutch elements for effecting a variable coupling of said clutch elements through the liquid in said chamber.

CLARENCE JOHNSON.

REFERENCES CITED

The following references are of record in the file of this patent:

UNITED STATES PATENTS

| Number | Name | Date |
|---|---|---|
| 818,828 | Kasson | Apr. 24, 1906 |
| 1,199,359 | Fottinger | Sept. 26, 1916 |
| 1,265,271 | Snyder | May 7, 1918 |
| 1,701,403 | Coykendall | Feb. 5, 1929 |
| 1,820,035 | Stokes | Aug. 25, 1931 |
| 1,921,042 | Roos | Aug. 8, 1933 |
| 2,047,028 | Metcalf | July 7, 1936 |
| 2,275,204 | Smirl | Mar. 3, 1942 |
| 2,376,939 | Ricart | May 29, 1945 |
| 2,406,486 | Bonham | Aug. 27, 1946 |
| 2,512,360 | McLean | June 20, 1950 |

FOREIGN PATENTS

| Number | Country | Date |
|---|---|---|
| 18,344 | Great Britain | Oct. 15, 1900 |